United States Patent [19]
Naito et al.

[11] Patent Number: 5,241,601
[45] Date of Patent: Aug. 31, 1993

[54] COMMUNICATION SYSTEM CAPABLE OF QUICKLY AND IMPARTIALLY ARBITRATING EMPLOYMENT OF A DATA BUS

[75] Inventors: Katsumi Naito; Michiaki Uchikawa, both of Tokyo, Japan

[73] Assignee: NEC Corporation, Tokyo, Japan

[21] Appl. No.: 994,526

[22] Filed: Dec. 21, 1992

[30] Foreign Application Priority Data

Dec. 20, 1991 [JP] Japan .................................. 3-339025

[51] Int. Cl.$^5$ .............................................. H04K 1/00
[52] U.S. Cl. ........................................ 380/23; 380/49; 340/825.51; 395/425; 395/725; 370/85.6
[58] Field of Search ...................... 380/3, 4, 23, 24, 25, 380/48, 49, 50; 358/349; 455/26.1; 340/825.5, 825.51; 395/425, 725; 370/85.6

[56] References Cited

U.S. PATENT DOCUMENTS

| | | | |
|---|---|---|---|
| 4,631,534 | 12/1986 | Franklin et al. | 340/825.51 X |
| 4,633,394 | 12/1986 | Georgiou et al. | 340/825.51 X |
| 4,638,120 | 1/1987 | Herve | 380/23 |
| 4,745,548 | 5/1988 | Blahut | 340/825.51 X |
| 5,119,374 | 6/1992 | Firoozmand et al. | 340/825.51 X |
| 5,140,680 | 8/1992 | Best | 395/725 X |

FOREIGN PATENT DOCUMENTS 1-117543 10/1989 Japan .

*Primary Examiner*—Tod R. Swann
*Attorney, Agent, or Firm*—Sughrue, Mion, Zinn, Macpeak & Seas

[57] ABSTRACT

In a communication system comprising a plurality of interface circuits (11-1 to 11-3) for communicating with a communication device through a data bus (13) and an arbitrator circuit (12) for arbitrating a data bus employment among the interface circuits when the interface circuits communicate with the communication device through the data bus. The arbitrator circuit is connected to the interface circuits by first through third buses (21 to 23). The interface circuits have individual addresses which are different from one another. Each of the interface circuits supplies the first bus with a demand signal which is representative of a level of employing the data bus. The arbitrator circuit supplies a priority address to the second bus in accordance with the demand signal. Each of the interface circuits supplies a conflict address to the first bus in response to the priority address. The arbitrator circuit supplies an arbitration address to the third bus in accordance with the priority address and the conflict address. Each of the interface circuits acquires a transmission right to employ the data bus in accordance with the arbitration address.

10 Claims, 5 Drawing Sheets

FIG. I

COMMUNICATION SYSTEM CAPABLE OF QUICKLY AND IMPARTIALLY ARBITRATING EMPLOYMENT OF A DATA BUS

BACKGROUND OF THE INVENTION

This invention relates to a communication system for communicating with a communication device which is connected to the communication system through a data bus and which is for use in communicating with an external device or a network.

It is known that a communication system comprises a plurality of interface circuits connected through a data bus to a communication device which is operable to control the communication system. The interface circuits communicate with the communication device through the data bus. On communicating with the communication device, the interface circuits employ or utilize the data bus in common. Accordingly, it is necessary to arbitrate employment or utilization of the data bus among the interface circuits.

In a conventional communication system, the interface circuits are connected to one another through a common bus which is different from a data bus. On employing the data bus, the interface circuits supply the common bus with individual addresses which are assigned to the interface circuits and which are different from one another. On the common bus, a logical OR signal appears which is representative of a logical addition of the individual addresses. When the logical OR signal is representative of a specific one of the individual addresses, the interface circuit of the specific address can employ the data bus to communicate with the communication device through the data bus.

Inasmuch as the employment of the data bus is decided in accordance with the individual addresses in the conventional communication system, it is difficult for the interface circuits to impartially employ or utilize the data bus.

In order to impartially employ the data bus among the interface circuits, an improved communication system is disclosed in Japanese Patent Prepublication No. 117543/1989, namely, Tokkai Hei 1-117543 under the title of "Access Control Device".

The improved communication system comprises a random number generator for generating a random number and an exclusive OR circuit for calculating an exclusive OR between the random number and each of the individual addresses to produce an exclusive OR signal. When a specific one of the individual addresses is coincident with the exclusive OR signal, a specific interface circuit having the specific address can employ the data bus to communicate with the communication device through the data bus.

However, it is difficult to quickly arbitrate employment of the data bus among the interface circuits since an arbitration is carried out by the use of the random number which is irregularly generated.

SUMMARY OF THE INVENTION

It is therefore an object of this invention to provide a communication system capable of quickly and impartially arbitrating employment of a data bus.

Other objects of this invention will become clear as the description proceeds.

On describing the gist of this invention, it should be understood that a communication system comprises a plurality of interface circuits connected to a communication device through a data bus to communicate with the communication device through the data bus and a bus arbitrator circuit for arbitrating a data bus employment among the interface circuits when the interface circuits communicate with the communication device through the data bus. According to this invention, the bus arbitrator circuit is connected to the interface circuits by first through third buses. The interface circuits have individual addresses which are different from one another. Each of the interface circuits comprises first means for supplying the first bus with a demand signal which is representative of a level of employing the data bus, second means responsive to a priority address and the individual address for supplying the first bus with a conflict address, and third means responsive to an arbitration address for acquiring a transmission right to employ the data bus. The bus arbitrator circuit further comprises fourth means for supplying the priority address to the second bus in accordance with the demand signal and fifth means for supplying the arbitration address to the third bus in accordance with the priority address and the conflict address.

DESCRIPTION OF THE PREFERRED EMBODIMENT

Figure 1:
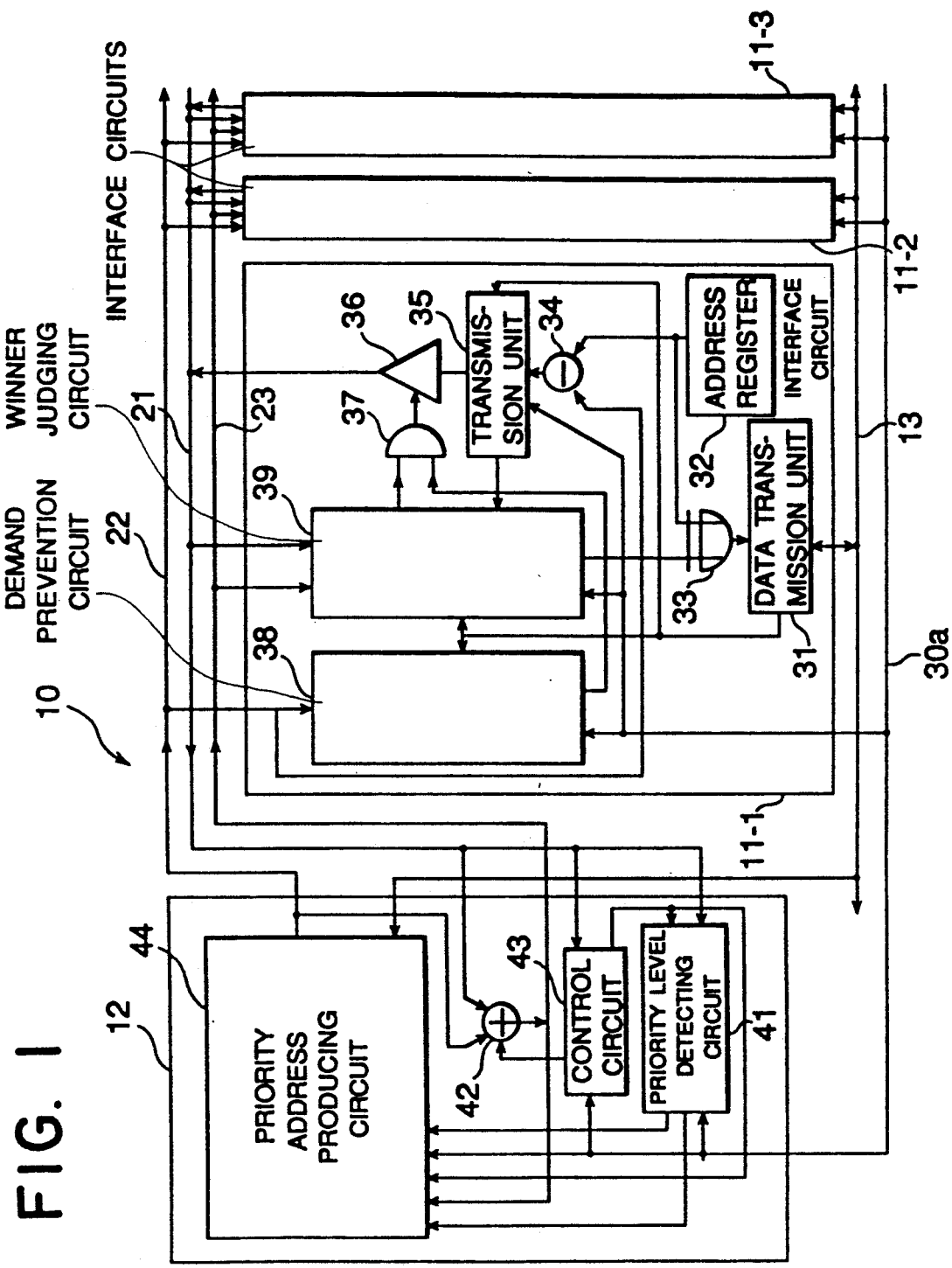
FIG. 1 is a block diagram of a communication system according to a preferred embodiment of this invention.

Referring to FIG. 1, description will proceed to a communication system 10 according to a preferred embodiment of this invention. The communication system 10 comprises first through N-th interface circuits 11-1 to 11-N and an arbitrator circuit 12, where N represents a positive integer which is not less than one. In the illustrated example, the positive integer N is equal to three.

The first through the third interface circuits 11-1 to 11-3 are connected through a data bus 13 to a communication device (not shown) which may be for use in communicating with a network (not shown). The first through the third interface circuits 11-1 to 11-3 are further connected to the arbitrator circuit 12 through first through third buses 21 to 23. When the first through the third interface circuits 11-1 to 11-3 communicate with the communication device through the data bus 13, the arbitrator circuit 12 arbitrates a data bus employment among the first through the third interface circuits 11-1 to 11-3. The first through the third interface circuits 11-1 to 11-3 are put into operation by a clock signal which is supplied to the first through the third interface circuits 11-1 to 11-3 through a clock signal line 30a. The clock signal is further supplied to the arbitrator circuit 12. The arbitrator circuit 12 is put into operation by the clock signal.

The first interface circuit 11-1 comprises a data transmission unit 31, an address register 32, an exclusive OR gate 33, a subtracter 34, a transmission unit 35, a gate 36, an AND gate 37, a demand prevention judging circuit 38, and a winner judging circuit 39, all of which will later be described in detail. The second and the third interface circuits 11-2 and 11-3 are similar in structure to the first interface circuit 11-1.

When the interface circuit 11-1 communicates with the communication device through the data bus 13, it is necessary for the first interface circuit 11-1 to acquire a permission of employment of the data bus 13. To this end, the data transmission unit 31 supplies a demand level signal or a priority level signal to the demand prevention judging circuit 38, the winner judging circuit 39, and the transmission unit 35 in order to demand employment of the data bus 13 before the data transmission unit 31 transmits a data signal to the communication device through the data bus 13 as shown at a first row labelled (a) in FIG. 2. The priority level signal has one of first through M-th priority levels, M represents a positive number which is not less than one. The first priority level is representative of a priority level of the first magnitude. The M-th priority level is representative of a priority level of the M-th magnitude. In the illustrated example, the positive number M is equal to three. The first priority level is represented as a first logic "00". The second priority level is represented as a second logic "01". The third priority level is represented as a third logic "10".

Responsive to the priority level signal, each of the demand prevention judging circuit 38 and the winner judging circuit 39 supplies a high level signal to an AND gate 37. As a result, the AND gate 37 supplies a gate 36 with an AND'ed signal having a high level. Supplied with the AND'ed signal, the gate 36 connects the transmission unit 35 to the first bus 21. The priority level signal is supplied from the transmission unit 35 to the first bus 21. The priority level signal is further supplied from the transmission unit 35 to the winner judging circuit 39.

Similarly, each of the second and the third interface circuits 11-2 and 11-3 transmit a priority level signal to the first bus 21 before each of the second and the third interface circuits 11-2 and 11-3 communicates with the communication device through the data bus 13.

Figure 2:
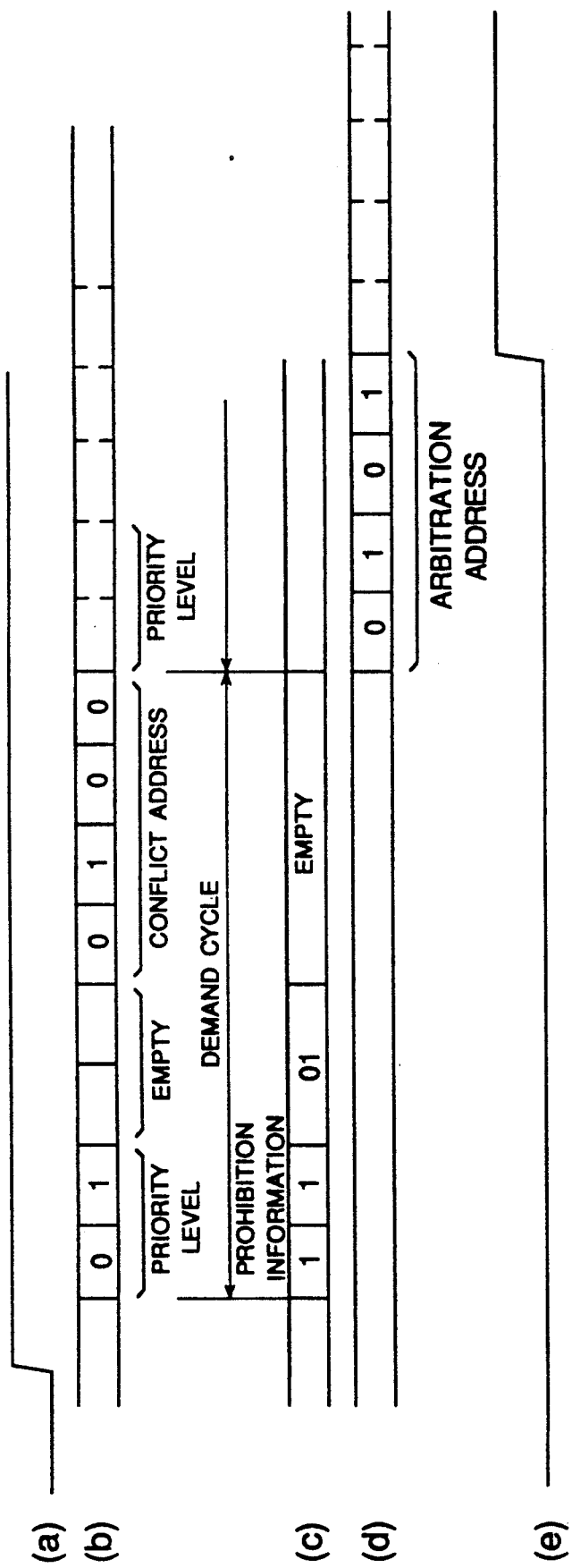
FIG. 2 is a time chart for use in describing an operation of the communication system illustrated in FIG. 1.

Referring to FIG. 2 in addition to FIG. 1, it is assumed that the first and the second interface circuits 11-1 and 11-2 demand to communicate with the communication device through the data bus 13 at the same time. As described above, each of the first and the second interface circuits 11-1 and 11-2 transmits the priority level signal to the first bus 21. It is assumed that the priority level signal from the first interface circuit 11-1 has the second priority level and the priority level signal from the second interface circuit 11-2 has the second priority level.

Attention is directed to the first interface circuit 11-1. In the illustrated example, the gate 36 has an open collector structure. As a result, a bit "0" is given the priority when the bit "0" conflicts with a bit "1" on the first bus 21.

Inasmuch as each of the first and the second interface circuits 11-1 and 11-2 transmits the priority level signal of the second priority level, the second logic "01" appears on the first bus 21 as shown at a second row labelled (b) in FIG. 2.

In the first interface circuit 11-1, the winner judging circuit 39 is given the priority level signal as an own priority level from the transmission unit 35. The winner judging circuit 39 obtains the priority level signal on the first bus 13 as a first bus priority level. The winner judging circuit 39 judges whether or not the own priority level is coincident with the first bus priority level. When the own priority level is not coincident with the first bus priority level, the winner judging circuit 39 supplies a low level signal to the AND gate 37. As a result, the AND gate 37 supplies the gate 36 with the AND'ed signal having a low level. The gate 36 disconnects the transmission unit 35 to the first bus 21. Similarly, the second interface circuit 11-2 judges whether or not the first bus priority level is coincident with own priority level of the second interface circuit 11-2.

In the illustrated example, each of the first and the second interface circuits 11-1 and 11-2 continues to transmit the priority level signal to the first bus 21 inasmuch as the own priority level is coincident with the first bus priority level.

The first bus priority level is given to the arbitrator circuit 12. The arbitrator circuit 12 comprises a priority level detecting circuit 41, an arbitrator adder 42, a control circuit 43, and a priority address producing circuit 44, all of which will later be described in detail. Supplied with the first bus priority level, the priority level detecting circuit 41 detects a level of the first bus priority level to produce a detection signal having the second priority level. The detection signal is delivered from the priority level detecting circuit 41 to the priority address producing circuit 44.

Figure 3:
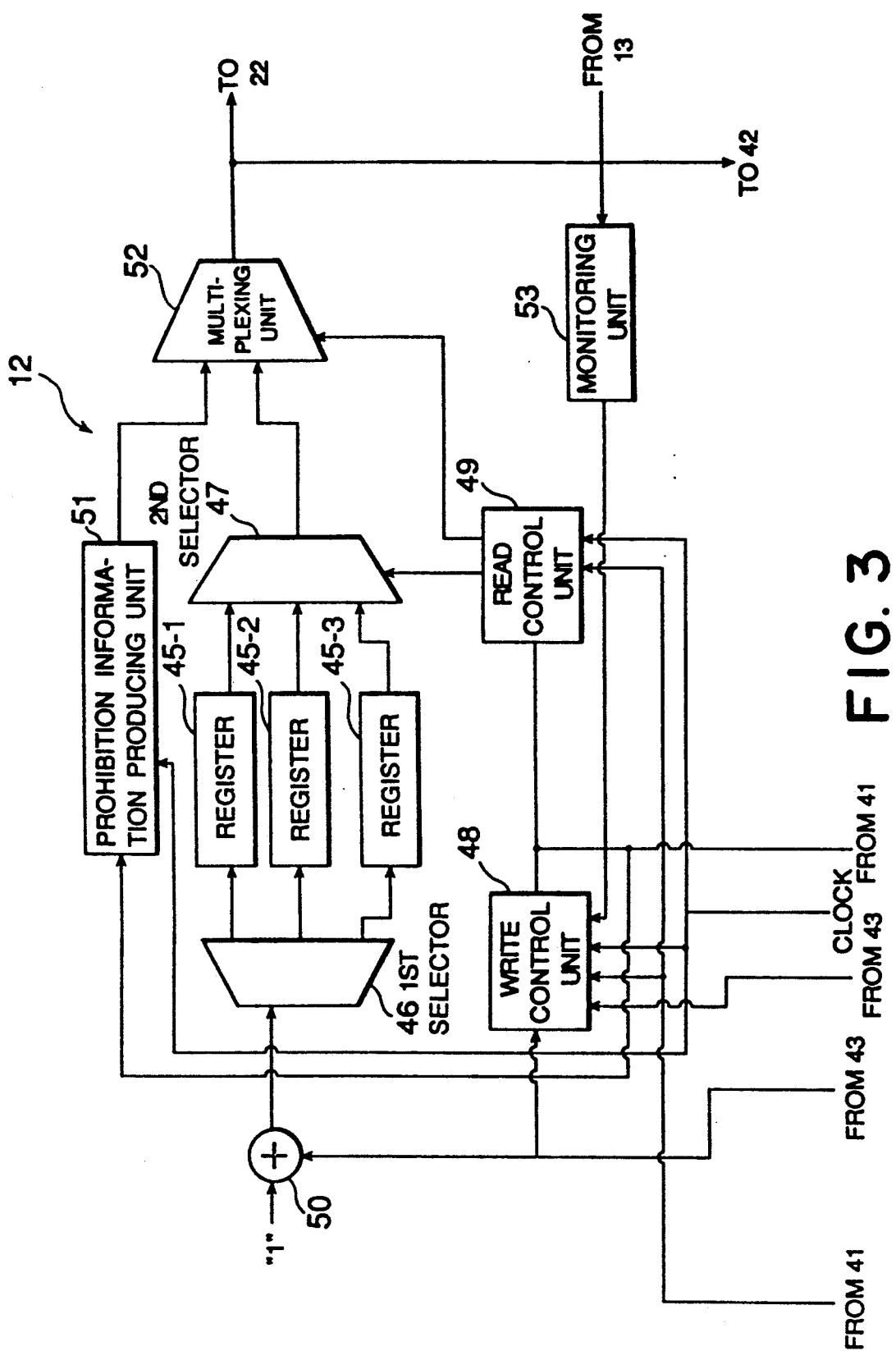
FIG. 3 is a block diagram of a priority address producing circuit used in an arbitrator circuit of the communication system illustrated in FIG. 1.

Referring to FIG. 3 together with FIG. 2, the priority address producing circuit 44 comprises first through M-th arbitrator registers 45-1 to 45-M. In the illustrated example, the priority address producing circuit 44 comprises first through third arbitrator registers 45-1 to 45-3. The priority address producing circuit 44 further comprises first and second selectors 46 and 47, write and read control units 48 and 49, an adder 50, a prohibition information producing unit 51, multiplexing unit 52, and a monitoring unit 53.

A predetermined priority address is registered in all of the first through the third arbitrator registers 45-1 to 45-3. Responsive to the detection signal, the read control unit 49 controls the second selector 47 so that the second selector 47 selects the second arbitrator register 45-2 to supply the multiplexing unit 52 with the predetermined priority address as a registered priority address. The registered priority address may be represented as a logic "01". The prohibition information producing unit 51 supplies the multiplexing unit 52 with a prohibition information having a logic "11". The multiplexing unit 52 supplies the second bus 22 with a multiplexed signal which has the prohibition information and the registered priority address as shown at a third row labelled (c) in FIG. 2.

Turning back to FIG. 1, the registered priority address is given to the demand prevention judging circuit 38 and the subtracter 34 in the first interface circuit 11-1. The demand prevention judging circuit 38 judges whether or not the first priority address is coincident with the priority level of the priority level signal. When the first priority address is coincident with the priority level of the priority level signal, the demand prevention judging circuit 38 supplies a low level signal to the AND gate 37. As a result, the AND gate 37 supplies the gate 36 with the AND'ed signal having a low level. The gate 36 disconnects the transmission unit 35 to the first bus 21. In this case, the gate 36 continues to connect the transmission unit 35 to the first bus 21 inasmuch as the priority level signal has the second priority level.

In the first interface circuit 11-1, the address register 32 has a first individual address. The first individual address is, for example, represented as a logic "0101". Similarly, the second interface circuits 11-2 and 11-3 have second and third individual addresses which may be represented as logics "0110" and "0111", respectively.

In the first interface circuit 11-1, the subtracter 34 subtracts the registered priority address from the first individual address to supply the transmission unit 35 with a first subtraction address which is represented as a logic "0100". The transmission unit 35 transmits the first subtraction address to the first bus 21 through the gate 36. Similarly, the second interface circuit 11-2 gives a second subtraction address to the first bus 21. The second subtraction address is represented as a logic "0101".

As described above, the bit "0" is given the priority on the first bus 21 when the bit "0" conflicts with the bit "1" on the first bus 21. Therefore, the first subtraction address, namely, the logic "0100" appears as a conflict address on the first bus 21 as shown at the second row labelled (b) in FIG. 2. At that time, the second interface circuit 11-2 stops transmitting the second subtraction address to the first bus 21 as described above.

When the conflict address appears on the first bus 21, the control unit 43 controls the arbitrator adder 42 so that the arbitrator adder 42 calculates a sum of the conflict address and the registered address to produce a first sum address which is represented as a logic "0101". The first sum address is used as an arbitration address. At that time, the control circuit 43 supplies a write control signal to the write control unit 48. Furthermore, the control circuit 43 informs the demand level detecting circuit 41 of an information signal which is representative of supply of the arbitration address to the third bus 23.

The arbitration address is supplied from the arbitrator adder 42 to the adder 50. The arbitration address is further supplied from the arbitrator adder 42 to the third bus 23 as shown at a fourth row labelled (d) in FIG. 2.

The adder 50 adds a logic "1" to the arbitration address to produce a second sum address which is represented as a logic "0110". Responsive to the write control signal, the write control unit 48 controls the first selector 46 so that the first selector 46 selects the second arbitrator register 45-2 to register the second sum address as the registered priority address in the second arbitrator register 45-2.

On the other hand, the winner judging circuit 39 takes the arbitration address from the third bus 23 to give the arbitration address to the exclusive OR gate 33. The exclusive OR gate 33 judges whether or not the arbitration address is coincident with the first individual address which is given from the address register 32. In the illustrated example, the exclusive OR gate 33 sends a permission signal to the data transmission unit 31 as shown at a fifth row labelled (e) in FIG. 2 inasmuch as the arbitration address is coincident with the first individual address. Responsive to the permission signal, the data transmission unit 31 starts to communicate with the communication device through the data bus 13.

Again referring to FIG. 1, each of the first and the second interface circuits 11-1 and 11-2 transmits the priority level signal to the first bus 21 when the first and the second interface circuits 11-1 and 11-2 again demand to communicate with the communication device through the data bus 13. It is assumed that the priority level signal from the first interface circuit 11-1 has the second priority level and the priority level signal from the second interface circuit 11-2 has the second priority level.

Inasmuch as the second logic "01" appears on the first bus 21 as described above, the second arbitrator register 45-2 is selected by the second selector 47. As a result, the second arbitrator register 45-2 supplies the multiplexing unit 52 with the registered priority of the logic "0110" as the priority address. As readily understood by the above description, the priority address of the logic "0110" is sent from the multiplexing unit 52 to the second bus 22.

When the priority address is equal to the logic "0110", the first interface circuit 11-1 transmits the conflict address of the logic "1111". Otherwise, the second interface circuit 11-2 transmits the conflict address of the logic "0000". As a result, the conflict address of the logic "0000" appears on the first bus 21.

When the conflict address appears on the first bus 21, the control circuit 43 controls the arbitrator adder 42 so that the arbitrator adder 42 calculates a sum of the conflict address of the logic "0000" and the priority address of the logic "0110" to produce the arbitration address of the logic "0110". The arbitration address of the logic "0110" is supplied from the arbitrator adder 42 to the priority address producing circuit 44 and the third bus 23. The control circuit 43 delivers the write control signal to the priority address producing circuit 44. Furthermore, the control circuit 43 supplies the information signal to the demand level detecting circuit 41.

Referring to FIG. 3, the adder adds the logic "1" to the arbitration address of the logic "0110" to produce the second sum address of the logic "0111". The second sum address of the logic "0111" is registered as the registered priority address in the second arbitrator register 45-2.

Turning back to FIG. 1, the second interface circuit 11-2 can communicate with the communication device through the data bus 13 inasmuch as the arbitration address is equal to the second individual address.

By the way, the priority is given to the first interface circuit 11-1 when it is assumed that the first interface circuit 11-1 always transmits the priority level signal of the logic "00". Namely, it is impossible for the second and the third interface circuits 11-2 and 11-3 to communicate with the communication device.

It is assumed that each of the first through the third arbitrator registers 45-1 to 45-3 registers a logic "00" as the predetermined registered address. As readily understood from the above description, the arbitration address of the logic "0101" is always supplied from the arbitrator adder 42 to the third bus 23. Therefore, the first interface circuit 11-1 can always communicate with the communication device.

In this embodiment, the demand level detecting circuit 41 counts the transmission number of the arbitration addresses whenever the priority level signal of the logic "00" is supplied from the first bus 21. When the transmission number is equal to a number K, the demand level detecting circuit 41 delivers a prohibition signal to the priority address producing circuit 44, where K represents a positive integer which is not less than one. For example, the number K is equal to three.

Referring to FIG. 3, the prohibition signal is delivered from the demand level detecting circuit 41 to the write and the read control units 48 and 49 and the prohibition information producing unit 51. Responsive to the prohibition signal, the write and the read control units 48 and 49 stop write-in and read-out operations, respectively. Supplied with the prohibition signal, the prohibition information producing unit 51 supplies the prohibition information to the multiplexing unit 52. The prohibition information is, for example, represented as a logic "00". The multiplexing unit 52 supplies the second bus 22 with the multiplexed signal having the priority address and the prohibition information.

Turning to FIG. 1, the demand prevention judging circuit 38 of the first interface circuit 11-1 judges whether or not the prohibition information is coincident with the priority level of the priority level signal. In this case, the demand prevention judging circuit 38 supplies the low level signal to the AND gate 37 inasmuch as the prohibition information is coincident with the priority level of the priority level signal. As a result, the AND gate 37 supplies the gate 36 with the AND'ed signal of the low level. The gate 36 disconnects the transmission unit 35 to the first bus 21. The priority level signal of the logic "00" is not given from the first interface circuit 11-1 to the first bus 21.

Figure 4:
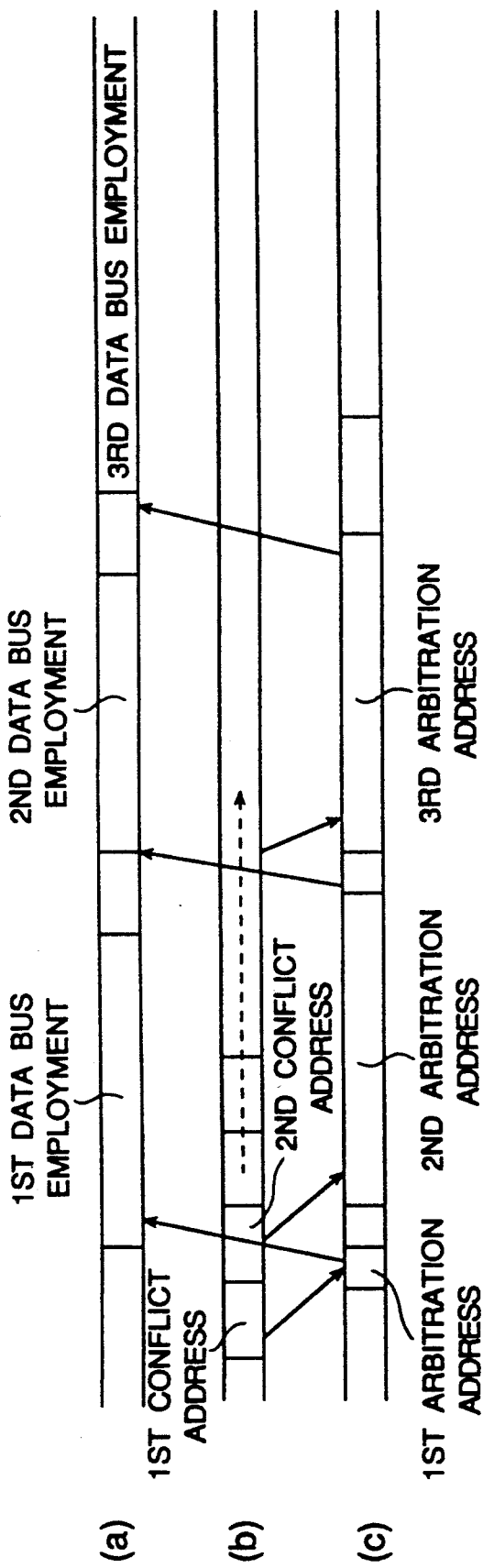
FIG. 4 is a time chart for use in describing a data transmission in the communication system illustrated in FIG. 1.

Referring to FIG. 4 in addition to FIGS. 1 and 3, the first through the third interface circuits 11-1 to 11-3 demand the data bus employment in a same priority level in a first data bus employment cycle as shown at a first row labelled (a) in FIG. 4, the conflict address appears as a first conflict address on the first bus 21 as shown at a second row labelled (b) in FIG. 4. As described above, the arbitrator circuit 12 supplies the arbitration address as a first arbitration address to the third bus 23 as shown at a third row labelled (c) in FIG. 4. As a result, one of the first through the third interface circuits 11-1 to 11-3 employs the data bus in the first data bus employment cycle.

The monitoring unit 53 monitors the data bus 13. When one of the first through the third interface circuits 11-1 to 11-3 transmits the data signal to the data bus 13, the monitoring unit 53 sends a monitor result signal to the write control unit 48. The write control unit 48 controls the first selector 46 in accordance with the monitor result signal so that the first selector 46 selects one of the first through the third arbitrator registers 45-1 to 45-3 to register the second sum address as the registered address therein.

Similarly, the conflict address appears as a second conflict address on the first bus 21 in a second data bus employment cycle. The arbitrator circuit 12 supplies the arbitration address as a second arbitration address to the third bus 23. Another one of the first through the third interface circuits 11-1 to 11-3 employs the data bus 13 in the second data bus employment cycle. In a third data bus employment cycle, the arbitration address is supplied as a third arbitration address from the arbitrator circuit 12 to the third bus 23. Still another one of the first through the third interface circuits 11-1 to 11-3 employs the data bus 12 in the third data bus employment cycle.

Inasmuch as the monitor unit 53 monitors the data bus 13 to immediately register the second sum address in one of the arbitrator registers 45-1 to 45-3 when the data signal appears on the data bus 13, it is possible for the arbitrator circuit 12 to immediately supply the arbitration address to the third bus 23 in accordance with the conflict address on the first bus 21 when one of the first through the third interface circuits 11-1 to 11-3 starts to transmit the data signal to the data bus 13.

Referring to FIG. 1, each of the first through the third interface circuits 11-1 to 11-3 periodically transmits the priority level signal to the first bus 21 until each of the first through the third interface circuits 11-1 to 11-3 receives the arbitration address which is equal to each of individual addresses.

When each of the first through the third interface circuits 11-1 to 11-3 does not acquire the arbitration address in a first demand interval, each of the first through the third interface circuits 11-1 to 11-3 transmits the priority level signal to the first bus 21 in a second demand interval.

When each of the first through the third interface circuits 11-1 to 11-3 is not given the priority by the priority level signal in the first demand interval, each of the first through the third interface circuits 11-1 to 11-3 transmits the priority level signal to the first bus 21 in the second demand interval.

When each of the first through the third interface circuits 11-1 to 11-3 is not given the priority by the conflict address in the first demand interval, each of the first through the third interface circuits 11-1 to 11-3 transmits the priority level signal to the first bus 21 in the second demand interval.

When each of the first through the third interface circuits 11-1 to 11-3 is given the priority by both of the priority level signal and the conflict address in the first demand interval, each of the first through the third interface circuits 11-1 to 11-3 waits for communicating with the communication device until the arbitration address is coincident with the own address. When each of the first through the third interface circuits 11-1 to 11-3 is given the priority by both of the priority level signal and the conflict address in the first demand interval, each of the first through the third interface circuits 11-1 to 11-3 may wait for communicating with the communication device until a predetermined time interval lapses.

Figure 5:
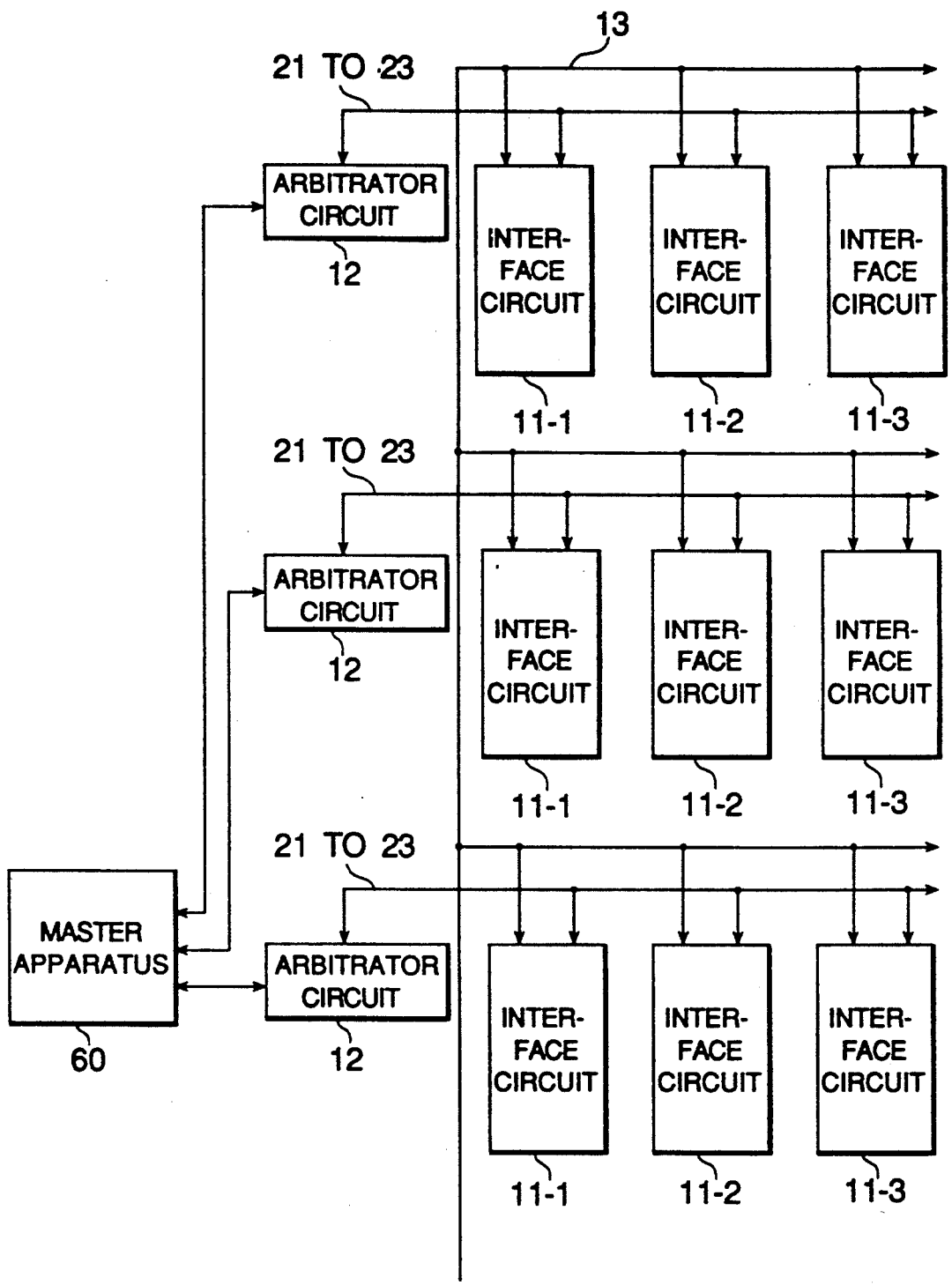
FIG. 5 is a block diagram of a system which comprises a plurality of the communication system illustrated in FIG. 1.

Referring to FIG. 5, an illustrated system comprises three communication systems each of which is similar in structure to the communication system illustrated in FIG. 1. The system further comprises a master apparatus 60. In the system, the master apparatus 60 arbitrates employment of the data bus 13 in a manner known in the art when conflict occurs among the communication systems on employing the data bus 13.

What is claimed is:

1. A communication system comprising a plurality of interface circuits connected to a communication device through a data bus to communicate with said communication device through said data bus and an arbitrator circuit for arbitrating a data bus employment among said interface circuits when said interface circuits communicate with said communication device through said data bus, wherein:

said arbitrator circuit is connected to said interface circuits by first through third buses;

said interface circuits having individual addresses which are different from one another;

each of said interface circuits comprising:

first means for supplying said first bus with a demand signal which is representative of a level of employing said data bus;

second means responsive to a priority address and said individual address for supplying said first bus with a conflict address; and third means responsive to an arbitration address for acquiring a transmission right to employ said data bus;

said bus arbitrator circuit comprising:

fourth means for supplying said priority address to said second bus in accordance with said demand signal;

fifth means for supplying said arbitration address to said third bus in accordance with said priority address and said conflict address.

2. A communication system as claimed in claim 1, wherein:

said demand signal has one of a plurality of priority level as said employment level;

said first bus being given a priority to one of the demand signals from said interface circuits;

said fourth means comprising:

detecting means responsive to said demand signal for detecting an employment level to produce a priority level; and first supplying means responsive to said priority level for supplying a predetermined address as said priority address to said second bus;

said fifth means comprising:

first adder means for calculating a sum of said priority address and said conflict address to supply said arbitration address to said third bus.

3. A communication system as claimed in claim 2, wherein said second means comprises:

subtracter means for subtracting said priority address from said individual address to produce said conflict address; and second supplying means for supplying said conflict address to said first bus.

4. A communication system as claimed in claim 3, wherein said arbitrator circuit further comprises:

second adder means for calculating a sum of said arbitration address and a prescribed number to produce a sum address; and register means for registering said sum address as a registered address therein.

5. A communication system as claimed in claim 4, wherein said prescribed number is equal to one.

6. A communication system as claimed in claim 4, wherein said arbitrator circuit further comprises:

monitoring means for monitoring whether or not said data bus is in employment, said monitoring means controlling said register means so that said register means registers said sum address.

7. A communication system as claimed in claim 4, wherein said interface circuit further comprises:

judging means for judging whether or not said conflict address is coincident with an address on said first bus, said judging means controlling said second supplying means to stop supply of said conflict address when said conflict address is not coincident with the address on said first bus.

8. A communication system as claimed in claim 7, wherein:

said judging means further judges whether or not said individual address is coincident with said arbitration address, said first judging means producing a permission signal representative of permitting communication between said interface circuit and said communication device.

9. A communication system as claimed in claim 8, wherein:

said detecting means further counts a transmission number of said arbitration addresses whenever said demand signal has a predetermined priority level, said detecting means producing a prohibition signal when said transmission number reaches to a number K, where K represents a positive integer which is not less than one;

said arbitrator circuit further comprising:

third supplying means responsive to said prohibition signal for supplying said second bus with a prohibition information which is representative of prohibiting transmission of said predetermined priority level;

said interface circuit comprising:

prohibiting means responsive to said prohibition information for prohibiting transmission of said predetermined priority level from said first means.

10. A communication system as claimed in claim 8, wherein:

said judging means still further judging whether or not said arbitration address appears on said third bus when said conflict address is coincident with said individual address within a predetermined time interval, said judging means controlling said first means so that said first means supplying said demand signal to said first bus.

* * * * *